United States Patent
Yu

(10) Patent No.: US 12,389,152 B2
(45) Date of Patent: Aug. 12, 2025

(54) VERTICAL INSERTION TYPE OWS EARPHONE CHARGING KIT

(71) Applicant: Shenzhen Huajue Communication Co., Ltd., Shenzhen (CN)

(72) Inventor: Suojie Yu, Shenzhen (CN)

(73) Assignee: Shenzhen Huajue Communication Co., Ltd., Shenzhen (CN)

( * ) Notice: Subject to any disclaimer, the term of this patent is extended or adjusted under 35 U.S.C. 154(b) by 195 days.

(21) Appl. No.: 18/373,831

(22) Filed: Sep. 27, 2023

(65) Prior Publication Data
US 2024/0323580 A1    Sep. 26, 2024

(30) Foreign Application Priority Data
Mar. 24, 2023    (CN) .......................... 202320734582.0

(51) Int. Cl.
*H04R 1/10*    (2006.01)
*H02J 7/00*    (2006.01)

(52) U.S. Cl.
CPC .......... *H04R 1/1025* (2013.01); *H02J 7/0045* (2013.01)

(58) Field of Classification Search
None
See application file for complete search history.

(56) References Cited

U.S. PATENT DOCUMENTS

2017/0104352 A1*    4/2017    Stratton ................ H02J 7/0044

FOREIGN PATENT DOCUMENTS

| JP | 2023142024 A | * | 10/2023 | |
| WO | WO-2020069374 A1 | * | 4/2020 | |
| WO | WO-2023020322 A1 | * | 2/2023 | ............. A45C 11/00 |

* cited by examiner

*Primary Examiner* — Qin Zhu

(57) ABSTRACT

The present utility model relates to the technical field of Bluetooth earphones, in particular to a vertical insertion type OWS earphone charging kit, including a charging case and an OWS earphone set, where the charging case includes a main body portion; two sets of insertion holes are formed side by side in one end of the main body portion; the OWS earphone set includes a right earphone; the right earphone includes a battery portion, an ear-mounted connecting wire, and a loudspeaker main body; and two ends of the ear-mounted connecting wire are connected to the loudspeaker main body and one end of the battery portion in a length direction, respectively.

4 Claims, 3 Drawing Sheets

VERTICAL INSERTION TYPE OWS EARPHONE CHARGING KIT

CROSS-REFERENCE TO RELATED APPLICATIONS

The application claims priority to Chinese patent application No. 2023207345820, filed on Mar. 24, 2023, the entire contents of which are incorporated herein by reference.

TECHNICAL FIELD

The present utility model relates to the technical field of Bluetooth earphones, in particular to a vertical insertion type OWS earphone charging kit.

BACKGROUND

Some OWS earphones on the market, when stored in charging cases, are mostly placed in a lying manner, which greatly increases the product size of the charging cases for the OWS earphones, making them inconvenient to take and carry and occupy a large space.

Therefore, the prior art has shortcomings and needs to be improved.

SUMMARY

In view of the deficiencies existing in the prior art, an objective of the present utility model is to provide a vertical insertion type OWS earphone charging kit.

To achieve the above objective, the present utility model provides a vertical insertion type OWS earphone charging kit, including a charging case and an OWS earphone set, where the charging case includes a main body portion; two sets of insertion holes are formed side by side in one end of the main body portion; the OWS earphone set includes a right earphone; the right earphone includes a battery portion, an ear-mounted connecting wire, and a loudspeaker main body; two ends of the ear-mounted connecting wire are connected to the loudspeaker main body and one end of the battery portion in a length direction, respectively; the insertion holes include a first insertion hole and a second insertion hole; the first insertion hole is matched in shape and size with the battery portion in the length direction, and the second insertion hole is matched in shape and size with the loudspeaker main body; and the right earphone is inserted into the first insertion hole by the battery portion and is inserted into the second insertion hole by the loudspeaker main body to implement vertical insertion of the right earphone.

Preferably, the charging case further includes a cover body having one end connected to a rotary shaft of the main body portion and the other end detachably connected to the main body portion.

Preferably, the cover body is connected to one end, close to the insertion holes, of the main body portion.

Preferably, the OWS earphone set further includes a left earphone in mirror symmetry with the right earphone.

Compared with the prior art, the present utility model has the following beneficial effects:

The charging case is designed to be provided with the vertical insertion type insertion holes, such that the charging case as a whole has a smaller size, is convenient for a user to take and carry, and occupies a smaller space, and the user has more spaces to carry other items, thereby improving the applicability of the product.

BRIEF DESCRIPTION OF DRAWINGS

To more clearly illustrate the solutions in the present utility model, the accompanying drawings that need to be used in the description of the embodiments of the present utility model will be briefly introduced below. Apparently, the accompanying drawings in the description below illustrate some embodiments of the present utility model. Those of ordinary skill in the art may also derive other accompanying drawings from these accompanying drawings without creative efforts.

DESCRIPTION OF REFERENCE NUMERALS

1. charging case; 2. OWS earphone set; 3. main body portion; 4. insertion hole; 5. right earphone; 6. battery portion; 7. ear-mounted connecting wire; 8. loudspeaker main body; 9. first insertion hole; 10. second insertion hole; 11. left earphone; and 12. cover body.

DETAILED DESCRIPTION OF THE EMBODIMENTS

The preferred embodiments of the present utility model are described in detail below with reference to the accompanying drawings, such that the advantages and features of the present utility model can be more easily understood by those skilled in the art, thereby providing a clearer definition of the scope of protection of the present utility model. Apparently, the described embodiments are merely some rather than all of the embodiments of the present utility model. All other embodiments obtained by those of ordinary skill in the art based on the embodiments of the present utility model without creative efforts fall within the scope of protection of the present utility model.

The terms "include/comprise" and "has/have" and any variations thereof in the description and claims of the present utility model and the description of the above accompanying drawings are intended to cover a non-exclusive inclusion. The terms "first", "second", etc. in the description and claims or the above drawings of the present utility model are used to distinguish different objects, but not to describe a particular order.

Figure 1:
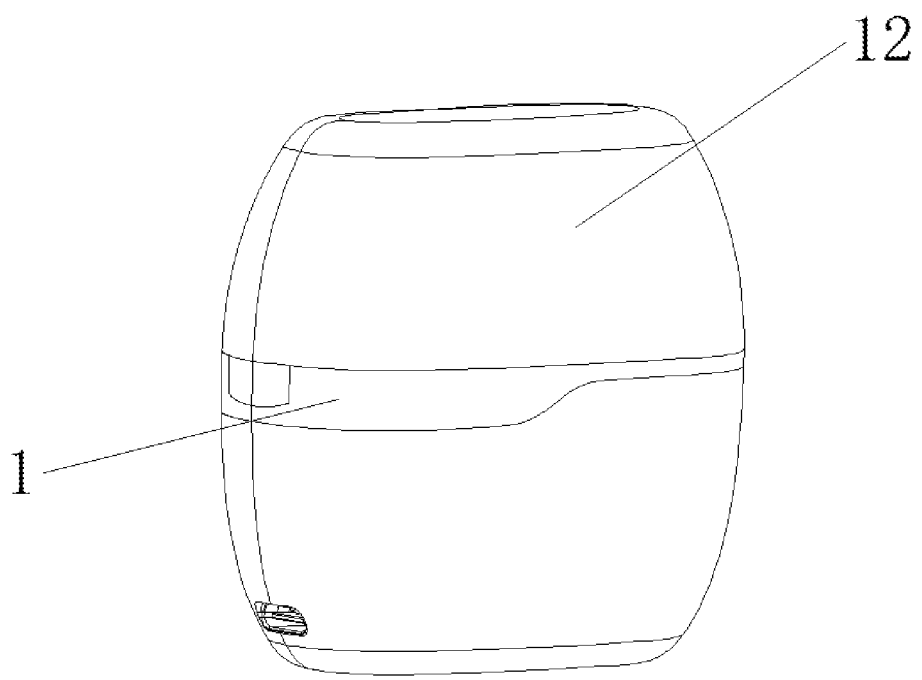
FIG. 1 is a three-dimensional structural diagram of a vertical insertion type OWS earphone charging kit provided by the present utility model.
Figure 2:
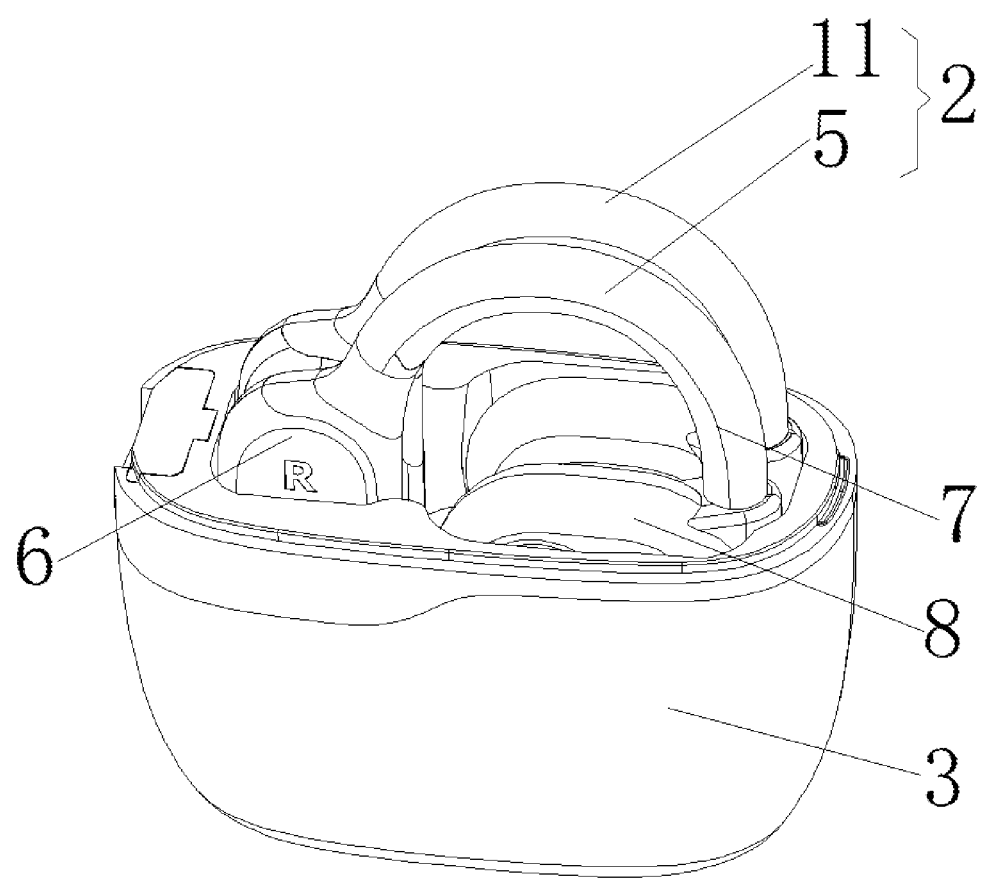
FIG. 2 is a three-dimensional structural diagram of a vertical insertion type OWS earphone charging kit provided by the present utility model except a cover body.
Figure 3:
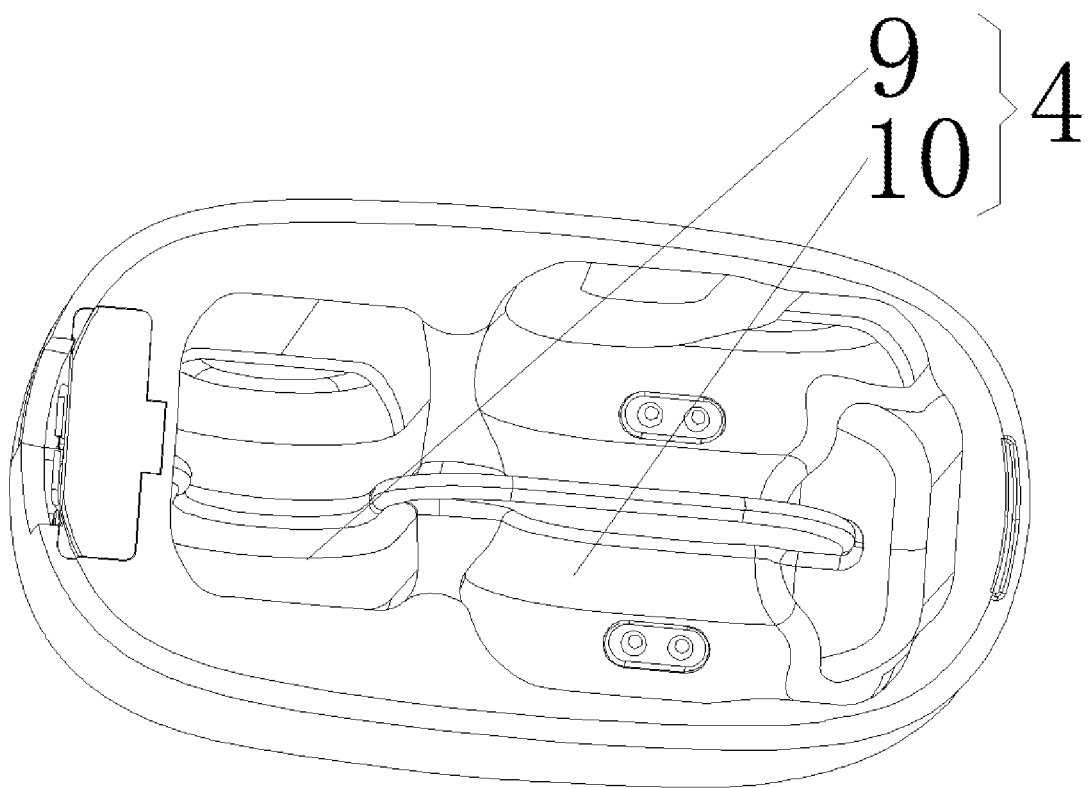
FIG. 3 is a three-dimensional structural diagram of a main body portion provided by the present utility model.

Referring to FIGS. 1-3, the present utility model provides a vertical insertion type OWS earphone charging kit, including a charging case 1 and an OWS earphone set 2, where the charging case includes a main body portion 3; two sets of insertion holes 4 are formed side by side in one end of the main body portion 3; the OWS earphone set 2 includes a right earphone 5; the right earphone 5 includes a battery portion 6, an ear-mounted connecting wire 7, and a loudspeaker main body 8; two ends of the ear-mounted connecting wire 7 are connected to the loudspeaker main body 8 and one end of the battery portion 6 in a length direction, respectively; the insertion holes 4 include a first insertion hole 9 and a second insertion hole 10; the first insertion hole 9 is matched in shape and size with the battery portion 6 in the length direction, and the second insertion hole 10 is matched in shape and size with the loudspeaker main body 8; the right earphone 5 is inserted into the first insertion hole 9 by the battery portion 6 and is inserted into the second insertion hole 10 by the loudspeaker main body 8 to implement vertical insertion of the right earphone 5; the OWS earphone set 2 further includes a left earphone 11 in mirror symmetry with the right earphone 5; and the left earphone 11 is inserted into the insertion holes 4 in the same manner as the right earphone 5.

Further, the charging case further includes a cover body 12 having one end connected to a rotary shaft of the main body portion 3 and the other end detachably connected to the main body portion 3. Specifically, the cover body 12 is connected to one end, close to the insertion holes 4, of the main body portion 3. The arrangement of the cover body 12 effectively prevents the entry of dust, prevents the earphones from rubbing against external objects, and prevents the earphones from falling out and being lost.

It can be understood that both the design of the charging case except the insertion holes 4 and the design of the loudspeaker main body 8 adopt existing technical solutions, and thus will not be repeated in the present utility model.

The above are merely used to illustrate the technical solutions of the present utility model, but not to limit them; although the present utility model has been described in detail with reference to the foregoing embodiments, it should be understood by those of ordinary skill in the art that they may still modify the technical solutions described in the foregoing embodiments, or equivalently substitute some or all of technical features therein; and any equivalent structures or equivalent process transformations made using the content of the description and drawings of the present utility model, directly or indirectly applied in other related technical fields, are similarly included in the scope of patent protection of the present utility model.

What is claimed is:

1. A vertical insertion type OWS earphone charging kit, comprising a charging case and an OWS earphone set, wherein the charging case comprises a main body portion; two sets of insertion holes are formed side by side in one end of the main body portion; the OWS earphone set comprises a right earphone; the right earphone comprises a battery portion, an ear-mounted connecting wire, and a loudspeaker main body; two ends of the ear-mounted connecting wire are connected to the loudspeaker main body and one end of the battery portion in a length direction, respectively; the insertion holes comprise a first insertion hole and a second insertion hole; the first insertion hole is matched in shape and size with the battery portion in the length direction, and the second insertion hole is matched in shape and size with the loudspeaker main body; and the right earphone is inserted into the first insertion hole by the battery portion and is inserted into the second insertion hole by the loudspeaker main body to implement vertical insertion of the right earphone.

2. The vertical insertion type OWS earphone charging kit according to claim 1, wherein the charging case further comprises a cover body having one end connected to a rotary shaft of the main body portion and the other end detachably connected to the main body portion.

3. The vertical insertion type OWS earphone charging kit according to claim 2, wherein the cover body is connected to one end, close to the insertion holes, of the main body portion.

4. The vertical insertion type OWS earphone charging kit according to claim 1, wherein the OWS earphone set further comprises a left earphone in mirror symmetry with the right earphone.

* * * * *